(12) United States Patent
Kim

(10) Patent No.: US 9,628,716 B2
(45) Date of Patent: Apr. 18, 2017

(54) METHOD FOR DETECTING CONTENT BASED ON RECOGNITION AREA AND ELECTRONIC DEVICE THEREOF

(71) Applicant: Samsung Electronics Co., Ltd., Suwon-si, Gyeonggi-do (KR)

(72) Inventor: Nam-Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/672,931

(22) Filed: Mar. 30, 2015

(65) Prior Publication Data

US 2015/0288884 A1   Oct. 8, 2015

(30) Foreign Application Priority Data

Apr. 4, 2014   (KR) .................. 10-2014-0040404

(51) Int. Cl.
*H04N 5/232* (2006.01)
*G06K 9/20* (2006.01)
*G06K 7/14* (2006.01)
*H04N 1/00* (2006.01)

(52) U.S. Cl.
CPC ....... *H04N 5/23293* (2013.01); *G06K 9/2054* (2013.01); *H04N 5/23212* (2013.01); *G06K 7/1439* (2013.01); *H04N 1/00334* (2013.01)

(58) Field of Classification Search
CPC .................. H04N 5/23212; G06K 9/2054
See application file for complete search history.

(56) References Cited

U.S. PATENT DOCUMENTS

| 2005/0041862 | A1 | 2/2005 | Lo | |
| 2009/0212112 | A1* | 8/2009 | Li | ............... G06K 7/10 235/462.12 |
| 2011/0123115 | A1 | 5/2011 | Lee et al. | |
| 2014/0086483 | A1* | 3/2014 | Zhang | ............. G06K 9/3216 382/165 |

FOREIGN PATENT DOCUMENTS

| KR | 10-2006-0105930 A | 10/2006 |
| KR | 10-2012-0127571 A | 11/2012 |

\* cited by examiner

*Primary Examiner* — Ahmed A Berhan
(74) *Attorney, Agent, or Firm* — Jefferson IP Law, LLP

(57) ABSTRACT

An electronic device and method of operation an electronic device are provided. The method include acquiring, by the electronic device, at least one first image before a focus setup is performed by an image taking module connected to the electronic device, detecting a first content related to the acquired at least one first image, setting a recognition area, based on a result of the detection of the first content, such that the recognition area includes the first content, acquiring a focus-set second image from the image taking module, detecting a second content related to the second image based on the recognition area, and expressing the second content through a display connected to the electronic device.

20 Claims, 9 Drawing Sheets

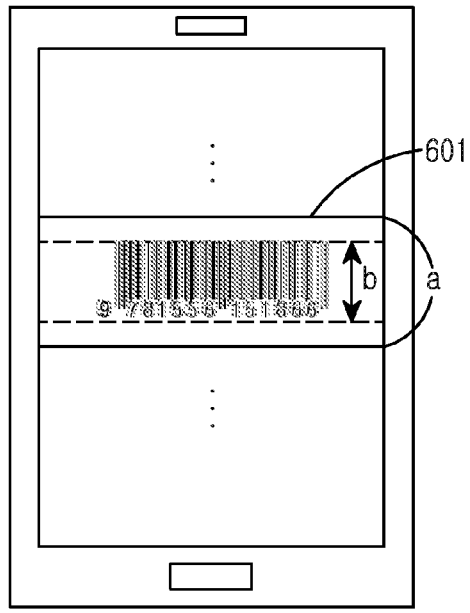
FIG.6A FIG.6B
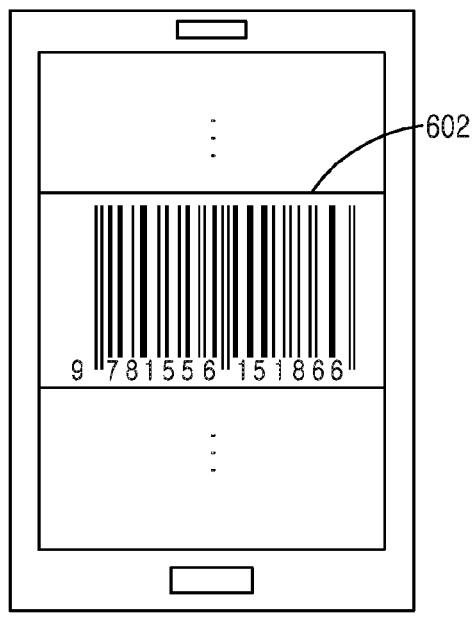
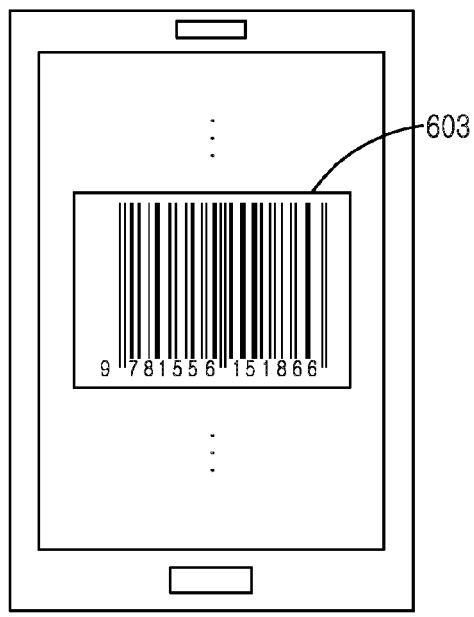
FIG.6C FIG.6D

METHOD FOR DETECTING CONTENT BASED ON RECOGNITION AREA AND ELECTRONIC DEVICE THEREOF

CROSS-REFERENCE TO RELATED APPLICATION(S)

This application claims the benefit under 35 U.S.C. §119 (a) of a Korean patent application filed on Apr. 4, 2014 in the Korean Intellectual Property Office and assigned Serial number 10-2014-0040404, the entire content disclosure of which is hereby incorporated by reference.

TECHNICAL FIELD

The present disclosure relates to an electronic device and method for detecting a content based on a recognition area.

BACKGROUND

The development of functions of electronic devices has made it possible to utilize content stored in an electronic device, while inputting a specific character or a telephone number, for example, to the electronic device. For example, when a telephone number has been stored in an electronic device in an image type, the user need not manually input the telephone number to the electronic device, but only has to execute a telephone application and recall the stored image, thereby making it more convenient for the user to make a phone call. In addition, the electronic device provides the user with preview data in order to set a recognition area using a frame, which has been received in real time from an optical character recognition (OCR) engine when a character recognition function is executed.

When an OCR engine is provided in a conventional electronic device that recognizes preview data through a camera module, there are problems concerning the character recognition ratio, power consumption, and the processing rate resulting from the OCR operation. For example, when recognizing preview data, the electronic device generally sets an overall area or sets an area of a fixed size, and the resulting unnecessary area recognition degrades recognition performance or increases power consumption.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for performing content detection regarding a focused image based on a recognition area that has been set based on a preview image before focusing, thereby increasing a calculation efficiency of content detection regarding the focused image.

Another aspect of the present disclosure is to provide an electronic device and method for performing content detection regarding some preview images from among a plurality of preview images before focusing, in order to set a recognition area, thereby reducing power consumption for content detection regarding preview images.

Another aspect of the present disclosure is to provide an electronic device and method for performing content detection for recognition area setup, when there is no information stored in connection with a recognition area in which content recognition has previously succeeded, thereby reducing power consumption for content detection for recognition area setup.

In accordance with an aspect of the present disclosure, a method of operating an electronic device is provided. The method includes acquiring at least one first image before a focus setup is performed by an image taking module connected to the electronic device, detecting a first content related to the acquired at least one first image, setting a recognition area, based on a result of the detection of the first content related to the first image, such that the recognition area includes the first content, acquiring a focus-set second image from the image taking module, detecting a second content related to the second image based on the recognition area, and expressing the second content through a display connected to the electronic device.

In accordance with another aspect of the present disclosure, an electronic device is provided. The electronic device includes an image taking module configured to generate at least one first image before performing a focus setting and to generate a focus-set second image, and a content detection module connected to the image taking module and implemented as a processor, wherein the content detection module is configured to detect a first content related to the generated at least one first image, to set a recognition area, based on a result of the detection of the first content related to the at least one first image, such that the recognition area includes the first content, to detect a second content related to the second image based on the recognition area, and to express the second content through a display connected to the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, 6C, and 6D illustrate diagrams for recognizing a displayed barcode by changing a recognition area variably according to various embodiments of the present disclosure;

Throughout the drawings, it should be noted that like reference numbers are used to depict the same or similar elements, features, and structures.

DETAILED DESCRIPTION

Figure 1:
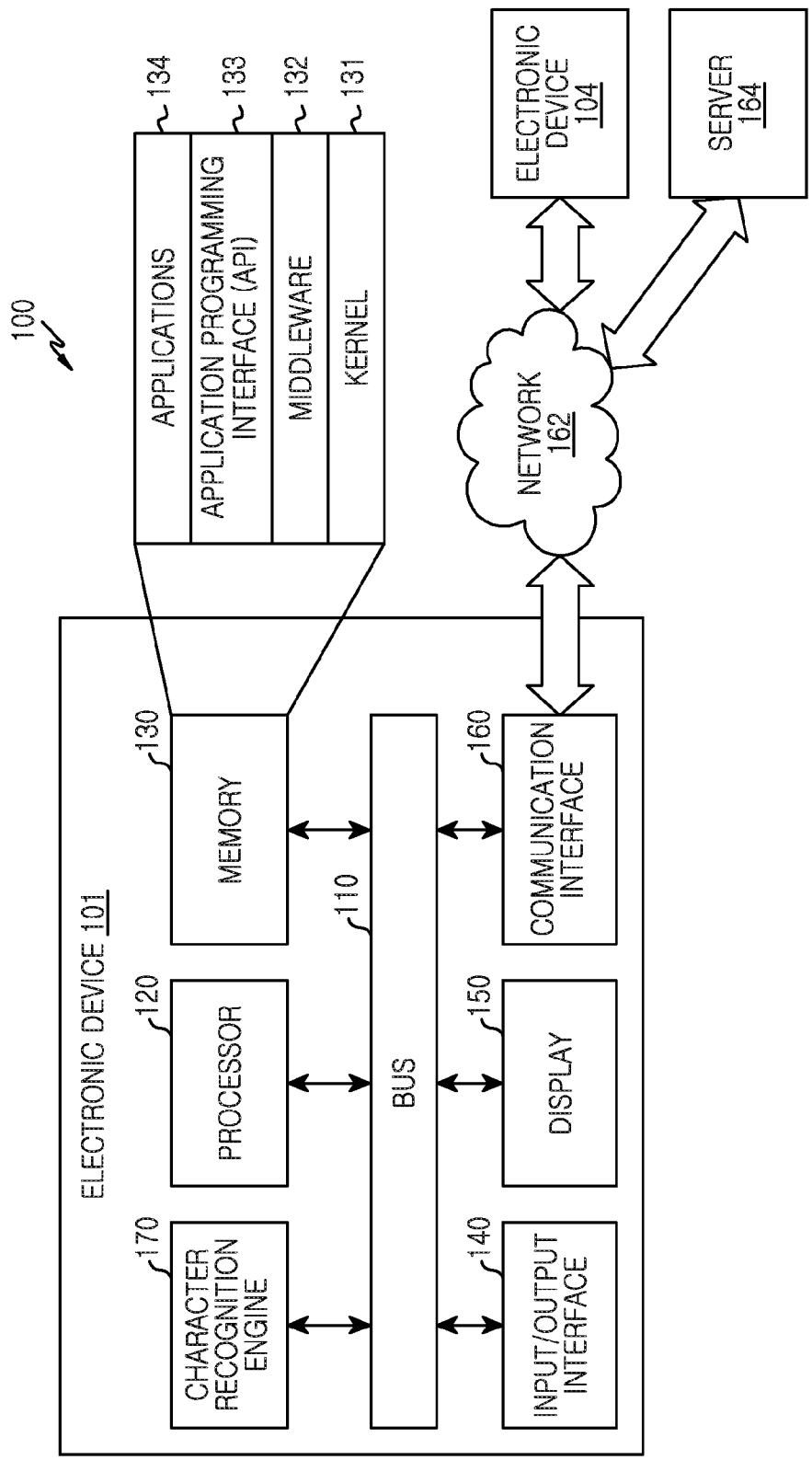
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expressions "include" and/or "may include" refer to existence of a corresponding function, operation, or element, and does not limit one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

Also, as used here, the expression "or" includes any or all combinations of words enumerated together. For example, the expression "A or B" may include A, may include B, or may include both A and B.

In the present disclosure, the expressions "a first," "a second," "the first," "the second," and the like may modify various elements, but the corresponding elements are not limited by these expressions. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element may be termed a second element, and similarly, a second element may be termed a first element without departing from the scope of the present disclosure.

When an element is referred to as being "coupled" and/or "connected" to any other element, it should be understood that not only the element may be directly coupled or connected to the other element, but also a third element may be interposed therebetween. Contrarily, when a element is referred to as being "directly coupled" or "directly connected" to any other element, it should be understood that no element is interposed therebetween.

The terms used herein are used only to describe particular embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meaning equal to the contextual meaning in the relevant field of art, and are not to be interpreted to have ideal or excessively formal meaning unless clearly defined in the present disclosure.

An electronic device according to the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, and a wearable device (for example, a Head-Mounted-Device (HMD) such as electronic glasses, electronic clothes, an electronic bracelet, an electronic necklace, an electronic appcessory, an electronic tattoo, and a smart watch).

According to various embodiments, the electronic device may be a smart home appliance with a communication function. The smart home appliances may include at least one of, for example, televisions, digital video disc (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to various embodiments of the present disclosure, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to various embodiments of the present disclosure, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. Also, the electronic device according to the present disclosure may be a flexible device. Further, it is obvious to those skilled in the art that the electronic device according to the present disclosure is not limited to the aforementioned devices.

Hereinafter, an electronic device according to the various embodiments of the present disclosure will be described with reference to the accompanying drawings. In various embodiments of the present disclosure, the term "user" may indicate a person using an electronic device or a device (e.g., an artificial intelligence electronic device) using an electronic device.

FIGS. 1 through 9, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 illustrates a network environment including an electronic device according to an embodiment of the present disclosure.

Referring to FIG. 1, a network environment 100 is illustrated, where the network environment 100 includes an electronic device 101, and where the electronic device 101 may include a bus 110, a processor 120, a memory 130, an input/output interface 140, a display 150, a communication interface 160, and a character recognition engine 170.

The bus 110 may be a circuit for connecting the aforementioned elements and transmitting communication (e.g., a control message) between the aforementioned elements.

For example, the processor 120 may receive instructions from the aforementioned other elements (e.g., the memory 130, the input/output interface 140, the display 150, and/or the communication interface 160) through the bus 110, decipher the received instructions, and perform calculation or data processing according to the deciphered instructions.

The memory 130 may store instructions or data received from or generated by the processor 120 or other elements (e.g., the input/output interface 140, the display 150, and/or the communication interface 160). The memory 130 may include programming modules, such as, for example, a kernel 131, middleware 132, an Application Programming Interface (API) 133, and/or applications 134. The aforementioned programming modules may be formed of software, firmware, hardware, or a combination of at least two thereof.

The kernel 131 may control or manage system resources (e.g., the bus 110, the processor 120, and/or the memory 130) used for executing an operation or a function implemented in the remaining other programming modules, for example, the middleware 132, the API 133, and/or the applications 134. In addition, the kernel 131 may provide an interface through which the middleware 132, the API 133, and/or the applications 134 may control or manage the individual elements of the electronic device 101 while accessing the individual elements.

The middleware 132 may serve as an intermediary enabling the API 133 and/or the applications 134 to transfer data through communication with the kernel 131. Furthermore, in regard to task requests received from the applications 134, the middleware 132 may perform a control (e.g., scheduling and/or load balancing) for the task requests, using a method such as allocating at least one of the applications 134 a priority for using the system resources (e.g., the bus 110, the processor 120, and the memory 130) of the electronic device 101.

The API 133 is an interface through which the applications 134 may control functions provided by the kernel 131 or the middleware 132 and may include at least one interface or function (e.g., instruction) for file control, window control, image processing, or text control.

According to various embodiments of the present disclosure, the applications 134 may include a short message service (SMS)/multimedia message service (MMS) application, an e-mail application, a calendar application, an alarm application, a health care application (e.g., application for measuring the amount of exercise and/or blood glucose), an environment information application (e.g., application for providing information regarding the atmospheric pressure, humidity, and/or temperature), or the like. Additionally or alternatively, the applications 134 may include an application related to an information exchange between the electronic device 101 and an external electronic device (e.g., an electronic device 104). The application related to the exchange of information may include, for example, a notification relay application for transferring specific information to the external electronic device or a device management application for managing the external electronic device.

For example, the notification relay application may include a function of transferring, to the external electronic device (for example, the electronic device 104), notification information generated from other applications of the electronic device 101 (for example, an SMS/MMS application, an e-mail application, a health care application, an environmental information application, and the like). Additionally or alternatively, the notification relay application may receive notification information from, for example, the external electronic device (e.g., the electronic device 104) and provide the received notification information to a user.

For example, the device management application may manage (e.g., install, delete, and/or update) functions for at least a part of the external electronic device (e.g., the electronic device 104) communicating with the electronic device 101 (e.g., turning on/off the external electronic device itself (or some elements thereof) and/or adjusting brightness (or resolution) of a display), applications operating in the external electronic device, and/or services (e.g., a telephone call service or a message service) provided from the external electronic device.

According to various embodiments of the present disclosure, the applications 134 may include an application designated according to the attribute of the external electronic device (e.g., the electronic device 104), such as the kind of the electronic device. For example, in a case where the external electronic device is an MP3 player, the applications 134 may include an application related to the reproduction of music. Similarly, when the external electronic device is a mobile medical device, the applications 134 may include an application related to the health care. According to an embodiment of the present disclosure, the applications 134 may include at least one from among an application designated to the electronic device 101 and an application received from an external electronic device (e.g., a server 164 and/or the electronic device 104).

The input/output interface 140 may transfer instructions or data input from a user through an input/output device (e.g., a sensor, a keyboard, and/or a touch screen) to the processor 120, the memory 130, and/or the communication interface 160 through, for example, the bus 110. For example, the input/output interface 140 may provide, to the processor 120, data regarding a user's touch input through the touch screen. In addition, through the input/output device (e.g., a speaker and/or a display), the input/output interface 140 may output instructions or data received from the processor 120, the memory 130, and/or the communication interface 160 through the bus 110. For example, the input/output interface 140 may output voice data, processed through the processor 120, to a user through a speaker.

The display 150 may display various pieces of information (e.g., multimedia data or text data) to a user.

The communication interface 160 may connect communication between the electronic device 101 and the external electronic device (e.g., the electronic device 104 and/or the server 164). For example, the communication interface 160 may be connected to a network 162 through wireless or wired communication to communicate with the external device. The wireless communication may include at least one of, for example, Wi-Fi, Bluetooth (BT), Near Field Communication (NFC), GPS and cellular communication (e.g., Long Term Evolution (LTE), LTE-Advanced (LTE-A), Code Division Multiple Access (CDMA), Wideband CDMA (WCDMA), Universal Mobile Telecommunication System (UMTS), Wireless Broadband (WiBro), and Global System for Mobile communication (GSM)). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment of the present disclosure, the network 162 may be a telecommunications network. The communication network may include at least one of a computer network, the Internet, the Internet of things, and a telephone network. According to an embodiment of the present disclosure, a protocol (e.g., a transport layer protocol, data link layer protocol, and/or a physical layer protocol) for communication between the electronic device 101 and the external device may be supported by at least one of the applications 134, the application programming interface 133, the middleware 132, the kernel 131, and the communication interface 160.

The character recognition engine 170 can recognize a content included in at least one recognition area from among a currently set recognition area, a recognition area calculated during a focusing operation, a recognition area stored at the latest previous time, and a combination thereof.

Figure 2:
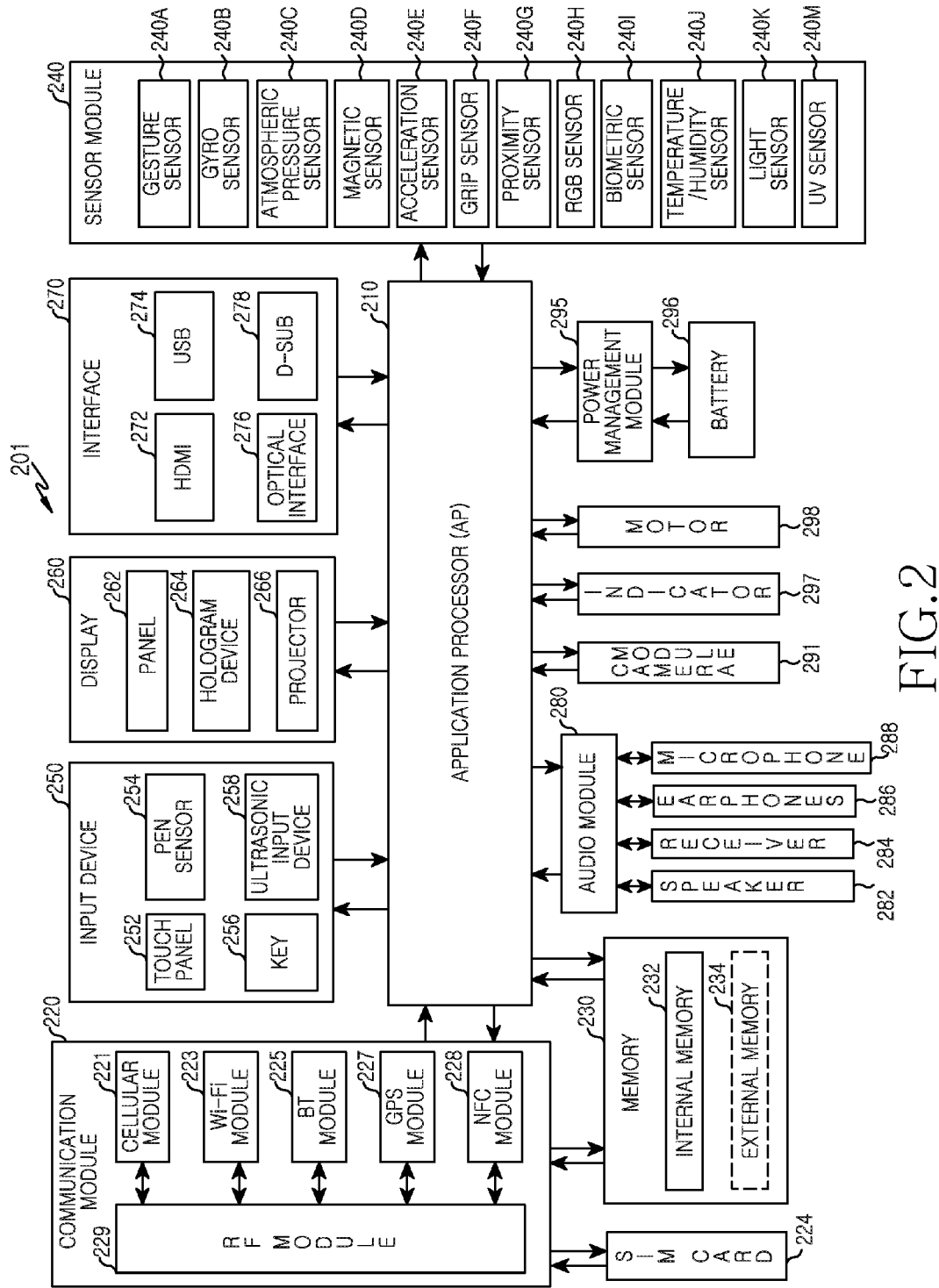
FIG. 2 illustrates a hardware block diagram according to an embodiment of the present disclosure.

FIG. 2 illustrates a hardware block diagram according to an embodiment of the present disclosure.

Referring to FIG. 2, and electronic device 201 is illustrated, where the electronic device 201 may constitute, for example, all or some of the electronic device 101 illustrated in FIG. 1. Specifically, the electronic device 201 may include at least one AP (application processor) 210, a communication module 220, a SIM (subscriber identification module) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware and/or software components connected to the AP 210 by driving an operating system or an application program and perform processing of various pieces of data including multimedia data and calculations. The AP 210 may be implemented by, for example, a System on Chip (SoC). According to an embodiment, the AP 210 may further include a graphic processing unit (GPU) (not shown).

The communication module 220 (e.g., the communication interface 160, as illustrated in FIG. 1) may perform data transmission/reception in communication between the electronic device 201 (e.g., the electronic device 101) and other electronic devices (e.g., the electronic device 104 and/or the server 164, as illustrated in FIG. 1) connected thereto through a network. According to an embodiment of the present disclosure, the communication module 220 may include a cellular module 221, a Wi-Fi module 223, a BT module 225, a GPS module 227, an NFC module 228, and a Radio Frequency (RF) module 229.

The cellular module 221 may provide a voice call, a video call, an SMS, and/or an Internet service through a communication network (for example, LTE, LTE-A, CDMA, WCDMA, UMTS, WiBro, and/or GSM). Furthermore, the cellular module 221 may distinguish between and authenticate electronic devices within a communication network by using, for example, a subscriber identification module (for example, the SIM card 224). According to an embodiment of the present disclosure, the cellular module 221 may perform at least a part of the functions that may be provided by the AP 210. For example, the cellular module 221 may perform at least some of the multimedia control functions.

According to an embodiment of the present disclosure, the cellular module 221 may include a communication processor (CP) (not illustrated). Furthermore, the cellular module 221 may be implemented by, for example, an SoC. Although elements such as the memory 230 or the power management module 295 are illustrated as separate elements from the AP 210, the AP 210 may be implemented to include at least a part (e.g., cellular module 221) of the above-mentioned elements, according to an embodiment of the present disclosure.

According to an embodiment of the present disclosure, the AP 210 and/or the cellular module 221 (e.g., communication processor) may load a command or data received from at least one of a non-volatile memory or other elements connected thereto into a volatile memory and process the loaded command. Furthermore, the AP 210 or the cellular module 221 may store data received from or generated by at least one of other elements in a non-volatile memory.

Each of the WiFi module 223, the BT module 225, the GPS module 227, and the NFC module 228 may include, for example, a processor for processing data transmitted/received through the corresponding module. Although each of the cellular module 221, the Wi-Fi module 223, the BT module 225, the GPS module 227, and the NFC module 228 is illustrated as a separate block, at least a part (e.g., two or more) of the cellular module 221, the Wi-Fi module 223, the BT module 225, the GPS module 227, and the NFC module 228 may be included in a single integrated chip (IC) or an IC package, according to an embodiment of the present disclosure. For example, at least a part (e.g., the communication processor corresponding to the cellular module 221 and a Wi-Fi processor corresponding to the Wi-Fi module 223) of the processors corresponding to the cellular module 221, the Wi-Fi module 223, the BT module 225, the GPS module 227, and the NFC module 228 may be implemented as a single SoC.

The RF module 229 may transmit/receive data, for example, an RF signal. Although not illustrated, the RF module 229 may include, for example, a transceiver, a Power Amp Module (PAM), a frequency filter, a Low Noise Amplifier (LNA) or the like. Further, the RF module 229 may further include a component for transmitting/receiving electronic waves over a free air space in wireless communication, for example, a conductor, a conducting wire or the like. Although the cellular module 221, the Wi-Fi module 223, the BT module 225, the GPS module 227, and the NFC module 228 are illustrated as sharing a single RF module 229 among them, at least one of the cellular module 221, the Wi-Fi module 223, the BT module 225, the GPS module 227, and the NFC module 228 may perform transmission/reception of RF signals through a separate RF module, according to an embodiment.

The SIM card 224 may be cards including subscriber identification modules, and may be inserted into slots formed on the electronic device at specific locations. The SIM card 224 may include unique identification information (for example, an Integrated Circuit Card IDentifier (ICCID)) and/or subscriber information (for example, International Mobile Subscriber Identity (IMSI)). For example, the SIM card 224 may include n SIM cards (n being any integer).

The memory 230 (for example, the memory 130) may include an internal memory 232 and/or an external memory 234. The internal memory 232 may include, for example, at least one of a volatile memory (e.g., a Dynamic random access memory (DRAM), a Static RAM (SRAM), and a Synchronous Dynamic RAM (SDRAM)), and a non-volatile memory (e.g., a One Time Programmable read only memory (OTPROM), a Programmable ROM (PROM), an Erasable and Programmable ROM (EPROM), an Electrically Erasable and Programmable ROM (EEPROM), a mask ROM, a flash ROM, a not and (NAND) flash memory, and a not or (NOR) flash memory).

According to an embodiment of the present disclosure, the internal memory 232 may be a solid state drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 may be functionally connected to the electronic device 201 through various interfaces. According to an embodiment of the present disclosure, the electronic device 201 may further include a storage device (or storage medium) such as a hard drive.

The sensor module 240 may measure a physical quantity and/or detect an operation state of the electronic device 201 and convert the measured or detected information to an electronic signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a red, green and blue (RGB) sensor 240H (for example a color sensor), a biometric sensor 240I, a temperature/humidity sensor 240J, a light sensor 240K (for example, an illumination sensor), and an Ultra Violet (UV) sensor 240M. Additionally or alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, and the like. The sensor module 240 may further include a control circuit for controlling at least one sensor involved therein.

The input device 250 may include a touch panel 252, a pen sensor 254, a key 256, and/or an ultrasonic input device 258. The touch panel 252 may recognize a touch input through at least one of a capacitive type, a resistive type, an infrared type, and an acoustic wave type. The touch panel 252 may further include a control circuit. In the case of the capacitive type, physical contact or proximity recognition is possible. The touch panel 252 may further include a tactile layer. In this case, the touch panel 252 may provide a user with a tactile reaction.

The pen sensor 254 may be implemented, for example, using the same or similar method to receiving a user's touch input or using a separate recognition sheet.

The key 256 may include, for example, a physical button, an optical key, and/or a keypad.

The ultrasonic input device 258 may identify data by detecting an acoustic wave with a microphone (e.g., microphone 288) of the electronic device 201 through an input tool that generates an ultrasonic signal, and may perform wireless recognition. According to an embodiment of the present disclosure, the electronic device 201 may also receive a user input from an external device (for example, a computer or a server) connected thereto by using the communication module 220.

The display 260 (e.g., the display 150, as illustrated in FIG. 1) may include a panel 262, a hologram device 264, and/or a projector 266.

The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be integrated with the touch panel 252.

The hologram 264 may show a stereoscopic image in the air using interference of light.

The projector 266 may project light onto a screen to display an image. The screen may be located, for example, inside or outside the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278.

The interface 270 may be included in, for example, the communication interface 160 illustrated in FIG. 1. Additionally or alternatively, the interface 270 may include, for example, a Mobile High-definition Link (MHL) interface, a SD/Multi-Media Card (MMC) interface, and/or an Infrared Data Association (IrDA) standard interface.

The audio module 280 may bilaterally convert a sound and an electronic signal. At least some elements of the audio module 280 may be included in, for example, the input/output interface 140, as illustrated in FIG. 1. The audio module 280 may process sound information input or output through, for example, a speaker 282, a receiver 284, earphones 286, and/or a microphone 288.

The camera module 291 is a device for capturing a still image or a video, and according to an embodiment of the present disclosure, may include one or more image sensors (e.g., a front sensor or a rear sensor), a lens (not illustrated), an Image Signal Processor (ISP) (not illustrated), and/or a flash (not illustrated) (e.g., an LED or xenon lamp).

The power management module 295 may manage power of the electronic device 201. Although not illustrated, the power management module 295 may include, for example, a Power Management Integrated Circuit (PMIC), a charger Integrated Circuit (IC), and/or a battery or fuel gauge.

The PMIC may be mounted in, for example, an IC or an SoC semiconductor. The charging methods may be divided into a wired type and a wireless type. The charger IC may charge a battery and prevent over voltage or over current from being introduced from a charger. According to an embodiment of the present disclosure, the charger IC may include a charger IC for at least one of the wired charging and the wireless charging. A magnetic resonance scheme, a magnetic induction scheme, or an electromagnetic scheme may be exemplified as the wireless charging method, and an additional circuit for wireless charging, such as a coil loop, a resonance circuit, or a rectifier circuit may be added.

The battery gauge may measure, for example, a residual quantity of the battery 296, or a voltage, a current, or a temperature during the charging. The battery 296 may store or generate electricity and supply power to the electronic device 201 using the stored or generated electricity. The battery 296 may include, for example, a rechargeable battery or a solar battery.

The indicator 297 may display a specific status of the electronic device 201 or a part (for example the AP 210) thereof, for example, a booting status, a message status, a charging status, and the like.

The motor 298 may convert an electrical signal to a mechanical vibration. Although not illustrated, the electronic device 201 may include a processing unit (for example, a GPU) for supporting mobile TV. The processing device for supporting mobile TV may process media data according to standards such as, for example, a digital multimedia broadcasting (DMB), a digital video broadcasting (DVB) or a media flow.

Each of the elements of the electronic device according to the present disclosure may be implemented by one or more components and the name of the corresponding element may vary depending on the type of the electronic device. The electronic device according to the present disclosure may be configured by including at least one of the above-described elements, and some of the elements may be omitted, or other elements may be added. Further, some of the elements of the electronic device according to the present disclosure may be combined to be one entity, which can perform the same functions as those of the components before the combination.

The term "module" used in the present disclosure may refer to, for example, a unit including one or more combinations of hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

An electronic device may include an image taking module configured to generate at least one first image before performing a focus setting and to generate a focus-set second image; and a content detection module connected to the image taking module and implemented as a processor, wherein the content detection module is configured to detect a first content related to the generated at least one first image, to set a recognition area, based on a result of the detection of the first content related to the at least one first image, such that the recognition area includes the first content, to detect a second content related to the second image based on the recognition area, and to express the second content through a display connected to the electronic device.

The first image may be at least one of a plurality of preview images generated while a lens of the image taking module is moving for the focus setup.

The content may include at least one from among a character, a quick response (QR) code, and a barcode.

The content detection module may be an electronic device configured to determine, when information stored in connection with a recognition area, in which a content recognition has succeeded before the first image is acquired, is deemed to exist, the recognition area based on the information without performing the detection of the first content.

The content detection module may be an electronic device configured to set, when the first content has been detected, a corresponding one from among a horizontal length and a vertical length of the first content based on at least one from among the horizontal length and the vertical length of the first content and, when the first content has not been detected, to set at least one from among the horizontal length and the vertical length of the first content as a specified value.

The content detection module may be an electronic device configured to store information related to the recognition area, when the second content has been detected, and, when the second content has not been detected, to reset information related to the recognition area to a specified value.

According to various embodiments of the present disclosure, at least some of the devices (for example, modules or functions thereof) or the method (for example, operations) according to the present disclosure may be implemented by a command stored in a non-transitory computer-readable storage medium in a programming module form. When the command is executed by one or more processors (for example, the processor 210), the one or more processors may execute a function corresponding to the command. The non-transitory computer-readable storage medium may be, for example, the memory 230. At least a part of the programming module may be implemented (for example, executed) by, for example, the processor 210. At least a part of the programming module may include, for example, a module, a program, a routine, a set of instructions and/or a process for performing one or more functions.

The non-transitory computer-readable recording medium may include magnetic media such as a hard disc, a floppy disc, and a magnetic tape, optical media such as a compact disc read only memory (CD-ROM) and a DVD, magneto-optical media such as a floptical disk, and hardware devices specifically configured to store and execute program commands, such as a ROM, a RAM, and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned elements or may further include other additional elements, or some of the aforementioned elements may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium storing commands that have been set to perform, when executed by at least one processor, at least one operation by means of the at least one processor may be provided, and the at least one operation may include the operations of: acquiring, by an electronic device, at least one first image before a focus setup is performed by an image taking module connected to the electronic device; detecting a first content related to the acquired at least one first image; setting a recognition area, based on a result of detection of a first content, such that the recognition area includes the first content; acquiring a focus-set second image from the image taking module; detecting a second content related to the second image based on the recognition area; and expressing the second content through a display connected to the electronic device.

Figure 3A:
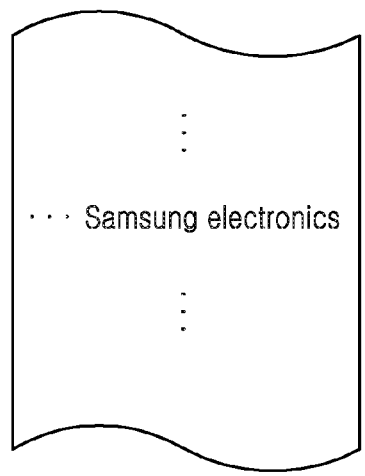
FIGS. 3A, 3B, and 3C illustrate diagrams for setting recognition areas during focusing operations according to various embodiments of the present disclosure.
Figure 3B:
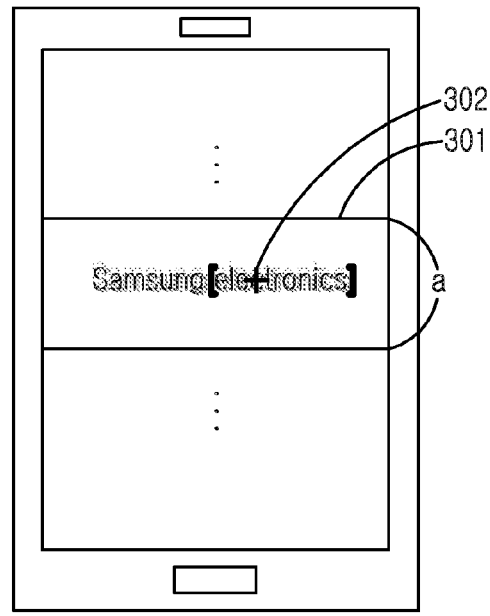
Figure 3C:
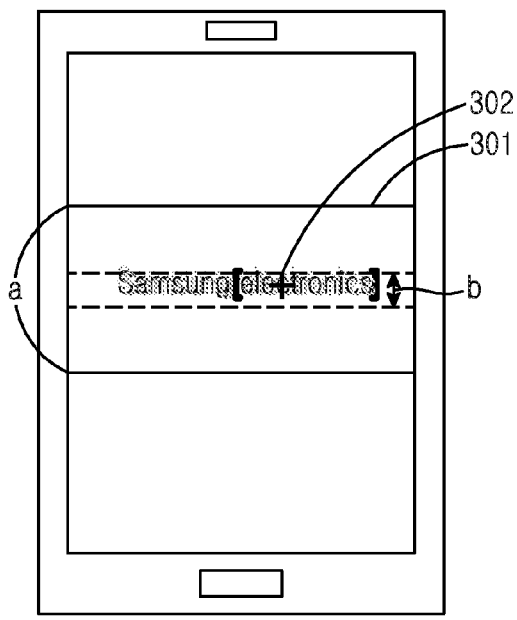

FIGS. 3A to 3C illustrate diagrams for setting recognition areas during focusing operations according to various embodiments of the present disclosure.

For example, an electronic device may calculate a recognition area for detecting contents between a release step and a focusing step. According to various embodiments, the release step refers to a step in which the lens of the camera module does not move, and the focusing step refers to a step in which the lens of the camera module that has not operated moves to make a focus. More specifically, when sensing a focusing step, the electronic device may approximately calculate a recognition area using only at least one frame among preview data regarding a content that is being transmitted in real time.

For example, a case will be described in which the electronic device senses a movement of the camera module and then confirms entry into a focusing step, in which the lens moves, from a release step. In the above-mentioned example, the electronic device may approximately calculate a recognition area for detecting a content, which is to be detected by the electronic device, using only one initial frame at the time of entry into a focusing step. According to various embodiments of the present disclosure, the electronic device may calculate a recognition area using only one initial frame at the time of entry into a focusing step, among data regarding a content that is being transmitted in real time, and may not process preview data that is being transmitted in real time.

As another example, the electronic device may approximately calculate a recognition area for detecting a content, which is to be detected by the electronic device, using only one frame after a preset time since the time of entry into a focusing step. According to various embodiments, the electronic device may calculate a recognition area using only one frame after a preset time since the time of entry into a focusing step, among data regarding a content that is being transmitted in real time, and may not process preview data that is being transmitted in real time.

Referring to FIG. 3A, an embodiment of the present disclosure wherein an electronic device approximately calculates a recognition area, upon entering a focusing step, will be described. For example, a case will now be described in which the electronic device is to detect content "Samsung electronics" on a part of a document, as illustrated in FIG. 3A.

According to various embodiments of the present disclosure, the electronic device may receive a command that instructs execution of a camera module provided on the electronic device and confirm entry from a release step, in which the lens does not move, to a focusing step, which occurs in a process of moving to a corresponding content in order to detect content "Samsung electronics" and a process of making a focus after the movement.

According to various embodiments of the present disclosure, the electronic device may determine whether the recognition area is identical to the default recognition area or not, when the electronic device has entered a focusing step, which occurs in a process of making a focus in order to detect content "Samsung electronics." As used herein, the default recognition area refers to an area set by the user or the manufacturer, and may also be the full screen. In addition, when no content can be recognized in the default recognition area, recognition is impossible. In addition, the recognition area may be an area set by the electronic device to recognize a content. When the electronic device determines that the recognition area is identical to the default recognition area, the electronic device may recognize characters using an optical character reader module or an optical character reader engine, which is provided in the electronic device, assuming that the default recognition area is the recognition area.

According to various embodiments of the present disclosure, the electronic device may determine whether a content, which is included in a recognition area that is identical to the default recognition area, has been detected or not.

Referring to FIG. 3B, an electronic device may determine whether content "electronics" has been detected with reference to a point 302 or not, as a result of recognizing content "Samsung electronics" included in a recognition area 301 using the optical character reader module, for example. When the electronic device determines that a content has been detected as a result of recognizing a content included in the recognition area, the electronic device may set the recognition area to be at least longer than the vertical length of the detected content. Herein, "a" indicates the vertical length of the recognition area 301.

Referring to FIG. 3C, a case will now be described in which content "Samsung electronics" has been detected as a result of recognizing content "Samsung electronics" during a focusing step while a recognition area 301 of an electronic device is set to be identical to the default recognition area.

For example, the electronic device may recognize the content during the focusing step before the focusing step is completed, as illustrated in FIGS. 3B and 3C.

In the above-mentioned example, the electronic device may set the recognition area of the default recognition area, which is the initial recognition area 301, to be at least longer than the vertical length of the detected content. According to various embodiments, the electronic device may set the recognition area again by making it at least longer than the vertical length b of a content detected approximately in a focusing step. According to various embodiments of the present disclosure, the recognition area may be set again to have a height corresponding to the vertical length b of a content detected by the electronic device.

When the electronic device has detected no character as a result of recognizing a content included in the recognition area, the electronic device may set the default recognition area as the recognition area and may not process character preview data that is being transmitted in real time until the focusing step ends.

When the electronic device determines that the recognition area is not identical to the default recognition area, the electronic device may instantly end the present embodiment for approximately calculating the recognition area. According to various embodiments of the present disclosure, determination by the electronic device that the recognition area is not identical to the default recognition area means that the recognition area is set based on information (height, length, etc.) regarding a recognition area in which recognition has recently succeeded.

Further, according to various embodiments, the electronic device according to the present disclosure may variably use at least one recognition area from among an initially set default recognition area, a newly set recognition area, a recognition area in which character detection has succeeded at the latest previous time, and a combination thereof, as a recognition area for recognizing a content. Accordingly, the electronic device according to various embodiments of the present disclosure is advantageous in that the recognition area, which is used to recognize a content, is minimized, thereby improving recognition performance. According to various embodiments, the electronic device is advantageous in that, since only one frame is used among preview data, which is being transmitted in real time, in the focusing step, current consumption can be reduced.

FIGS. 4A to 4D illustrate diagrams for recognizing a content using one from among a recognition area, which has been calculated during a focusing operation, and a recognition area, in which content detection has succeeded at a latest previous time, according to various embodiments of the present disclosure.

For example, when an electronic device senses a completion of a focusing step, the electronic device may recognize a content, which is displayed on the display module of the electronic device, using a variably changed recognition area. According to various embodiments, the electronic device may recognize a content displayed on the display module through the optical character reader module, for example, provided in the electronic device using at least one recognition area from among a default area, a recognition area calculated during a focusing operation, a recognition area in which content detection has succeeded at the latest previous time, and a combination thereof.

Figure 4A:
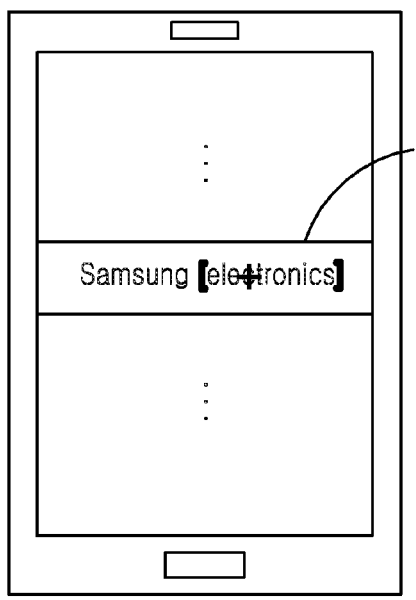
FIGS. 4A, 4B, 4C, and 4D illustrate diagrams for recognizing a content using at least one from among a recognition area, which has been calculated during a focusing operation, and a recognition area, in which content detection has succeeded at a latest previous time according to various embodiments of the present disclosure.
Figure 4B:
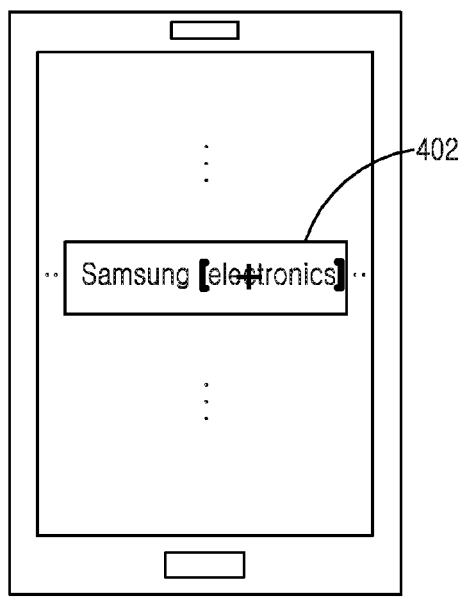

Referring to FIGS. 4A and 4B, for example, in order for an electronic device to recognize content "Samsung electronics," recognition areas calculated during a focusing operation have been set as recognition areas 401 and 402. According to various embodiments, the electronic device may recognize characters "Samsung electronics" using an optical character reader module, for example. For example, a recognition area calculated during a focusing operation in a recognition area of the initial default recognition area may be recognition area 401, in which only the vertical length of a content is considered, and/or may be recognition area 402 in which the horizontal length of the content is also considered.

Figure 4C:
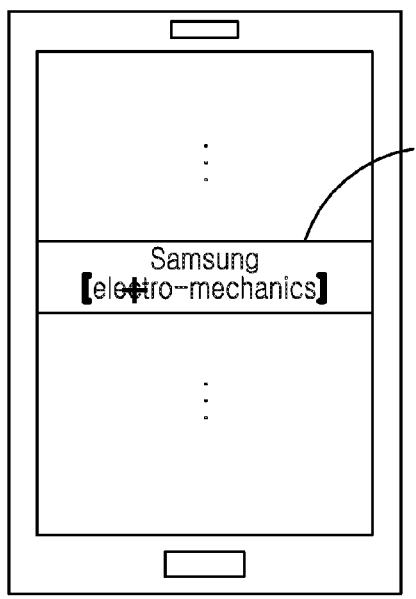
Figure 4D:
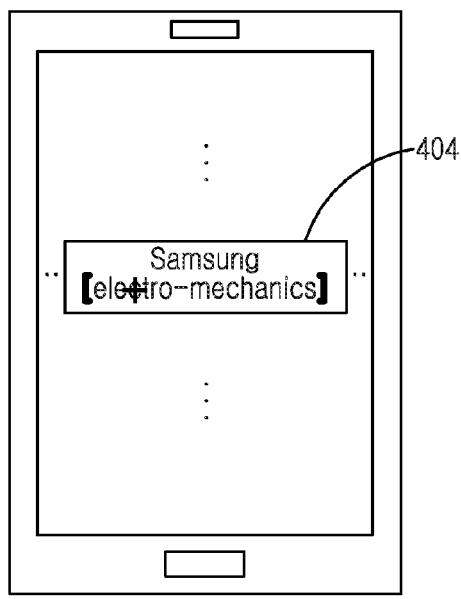

Referring to FIGS. 4C and 4D, in order for an electronic device to recognize content "Samsung electro-mechanics", recognition areas 403 and 404, in which content detection has succeeded at the latest previous time, have been set as recognition areas. According to various embodiments, the electronic device may recognize characters "Samsung-electro-mechanics" using an optical character reader module, for example. In this connection, a recognition area in which content detection has succeeded at the latest previous time during a focusing operation in a recognition area of the initial default recognition area may be recognition area 403, in which only the vertical length of a content is considered, and/or may be recognition area 404 in which the horizontal length of the content is also considered.

According to various embodiments of the present disclosure, the electronic device may determine whether a content can be detected in a recognition area by using one recognition area from among a default recognition area, a recognition area calculated during a focusing operation, and a recognition area in which content detection has succeeded at the latest previous time. When the electronic device determines that a content has been detected in the recognition area, the electronic device may perform an operation according to content recognition.

Figure 5A:
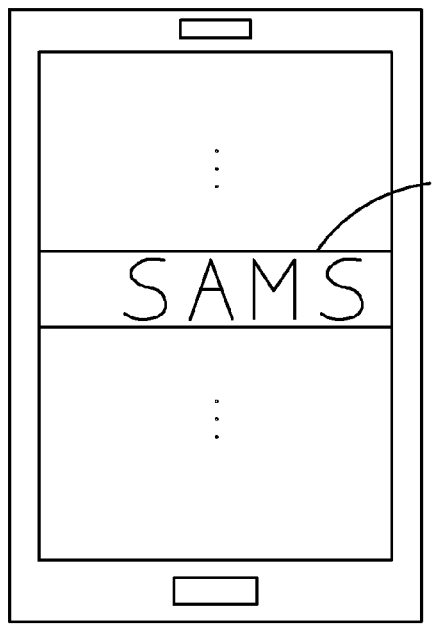
FIGS. 5A, 5B, and 5C illustrate diagrams for changing a recognition area to a default recognition area when no content detection has occurred as a result of recognizing a content in a variably changed recognition area according to various embodiments of the present disclosure.
Figure 5B:
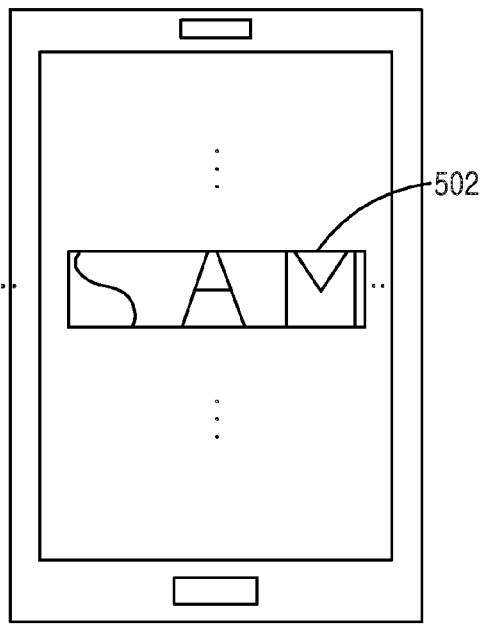
Figure 5C:
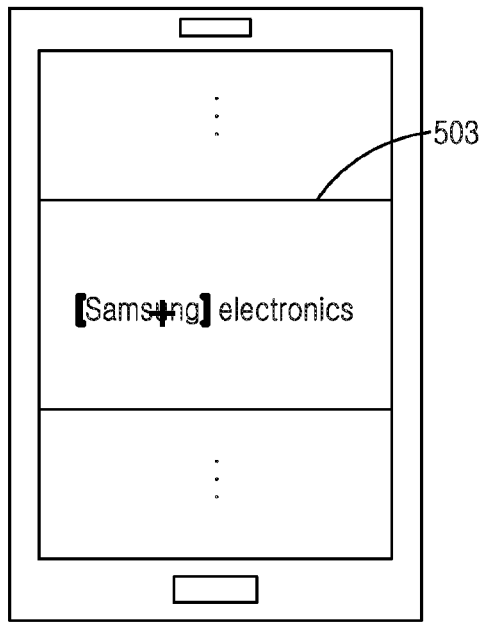

FIGS. 5A to 5C illustrate diagrams for changing a recognition area to a default recognition area when no content detection has occurred as a result of recognizing a content in a variably changed recognition area according to various embodiments of the present disclosure.

For example, when an electronic device senses completion of the focusing step, the electronic device may recognize a content, which is displayed on the display module of the electronic device, using a variably changed recognition area. According to various embodiments, the electronic device may recognize a content displayed on the display module through the optical character reader module, for example, provided in the electronic device using at least one recognition area from among a default recognition area, a recognition area calculated during a focusing operation, a recognition area in which content detection has succeeded at the latest previous time, and a combination thereof.

Referring to FIGS. 5A and 5B, for example, in order for the electronic device to recognize characters "Samsung electronics," recognition areas calculated during a focusing operation and/or recognition areas in which content detection has succeeded at the latest previous time have been set as recognition areas 501 and 502. According to various embodiments, the electronic device may recognize a content displayed on the electronic device using an optical character reader module, for example. For example, recognition areas 501 and 502 are set in a recognition area of the initial default recognition area and may be recognition area 501 in which only the vertical length is considered, and/or may be recognition area 502 in which the horizontal length of the content is also considered.

According to various embodiments of the present disclosure, the electronic device may determine whether content recognition has succeeded or not by using one recognition area from among a default recognition area, a recognition area calculated during a focusing operation, and a recognition area in which content detection has succeeded at the latest previous time. When the electronic device determines that content recognition has not succeeded, the electronic device may set the default recognition area as the recognition area and repeat the process of recognizing a displayed content.

Referring to FIG. 3C, when content recognition has failed because the currently set recognition area is smaller than the content as illustrated in FIGS. 5A and 5B, the electronic device may set a default recognition area 503 as the recognition area, and repeat a process for recognizing content "Samsung electronics" displayed on the display module of the electronic device.

FIGS. 6A to 6D illustrate diagrams for recognizing a displayed barcode by changing a recognition area variably according to various embodiments of the present disclosure.

For example, an electronic device may calculate a recognition area for detecting a content between a release step and a focusing step. According to various embodiments, when the electronic device has sensed a focusing step, the electronic device may calculate a recognition area using only one frame among preview data regarding a content that is being transmitted in real time. Hereinafter, an embodiment of recognizing a barcode by an electronic device will be described in detail.

The electronic device may receive a command that instructs execution of a camera module provided on the electronic device and confirm entry from a release step, in which the lens does not move, to a focusing step, which occurs in a process of moving to a place where the corresponding barcode is displayed order to detect the barcode and a process of making a focus after the movement.

According to various embodiments of the present disclosure, the electronic device may determine whether the recognition area is identical to the default recognition area or not, when the electronic device has entered a focusing step, which occurs in a process of making a focus in order to detect a barcode. When the electronic device determines that the currently set recognition area is identical to the default recognition area, the electronic device may determine whether a barcode, which is included in a recognition area set to be identical to the default recognition area, has been detected or not.

Referring to FIGS. 6A and 6B, an electronic device may determine whether a barcode displayed on the electronic device has been detected or not, as a result of recognizing a barcode, which is included in a recognition area 601, using an optical character reader module. Herein, "a" indicates the vertical length of the recognition area 601.

When the electronic device determines that a barcode has been detected as a result of recognizing a content included in the recognition area, the electronic device may set the recognition area to be at least longer than a vertical length of the detected content. A case will now be described in which a barcode has been detected as a result of recognizing a barcode during a focusing step in the recognition area 601, which is identical to the default recognition area, by the electronic device as illustrated in FIG. 6B, for example.

For example, the electronic device may recognize the content during the focusing step before the focusing step is completed, as illustrated in FIG. 6B.

In the above-mentioned example, the electronic device may set the recognition area 601 to be at least longer than the vertical length of the detected barcode. According to various embodiments of the present disclosure, the electronic device may set the recognition area by making it at least longer than the vertical length b of a barcode detected approximately in a focusing step. For example, the recognition area may be set again to have a height corresponding to the vertical length b of a barcode detected by the electronic device.

When the electronic device has detected no barcode as a result of recognizing a barcode included in the recognition area, the electronic device may set the default recognition area as the recognition area and may not process barcode preview data that is being transmitted in real time until the focusing step ends. According to various embodiments, when the electronic device determines that the currently set recognition area is not identical to the default recognition area, the electronic device may instantly end the present embodiment for approximately calculating the recognition area.

According to various embodiments of the present disclosure, when the electronic device senses completion of the focusing step, the electronic device may recognize a barcode, which is displayed on the display module of the electronic device, using a variably changed recognition area. According to various embodiments, the electronic device may recognize a barcode displayed on the display module through the optical character reader module, for example, provided in the electronic device using at least one recognition area from among a default recognition area, a recognition area calculated during a focusing operation, a recognition area in which barcode detection has succeeded at the latest previous time, and a combination thereof.

Referring to FIGS. 6C and 6D, for example, in order for an electronic device to recognize a barcode, recognition areas calculated during a focusing operation or recognition areas in which barcode detection has succeeded at a latest previous time have been set as recognition areas 602 and 603.

According to various embodiments of the present disclosure, the electronic device may recognize a barcode using an optical character reader module, for example. According to various embodiments of the present disclosure, the electronic device may determine whether a recognized barcode has been detected or not by using one recognition area from among a default recognition area, a recognition area calculated during a focusing operation, and a recognition area in which barcode detection has succeeded at the latest previous time. When the electronic device determines that a recognized barcode has been detected, the electronic device may perform an operation according to barcode recognition.

Figure 7:
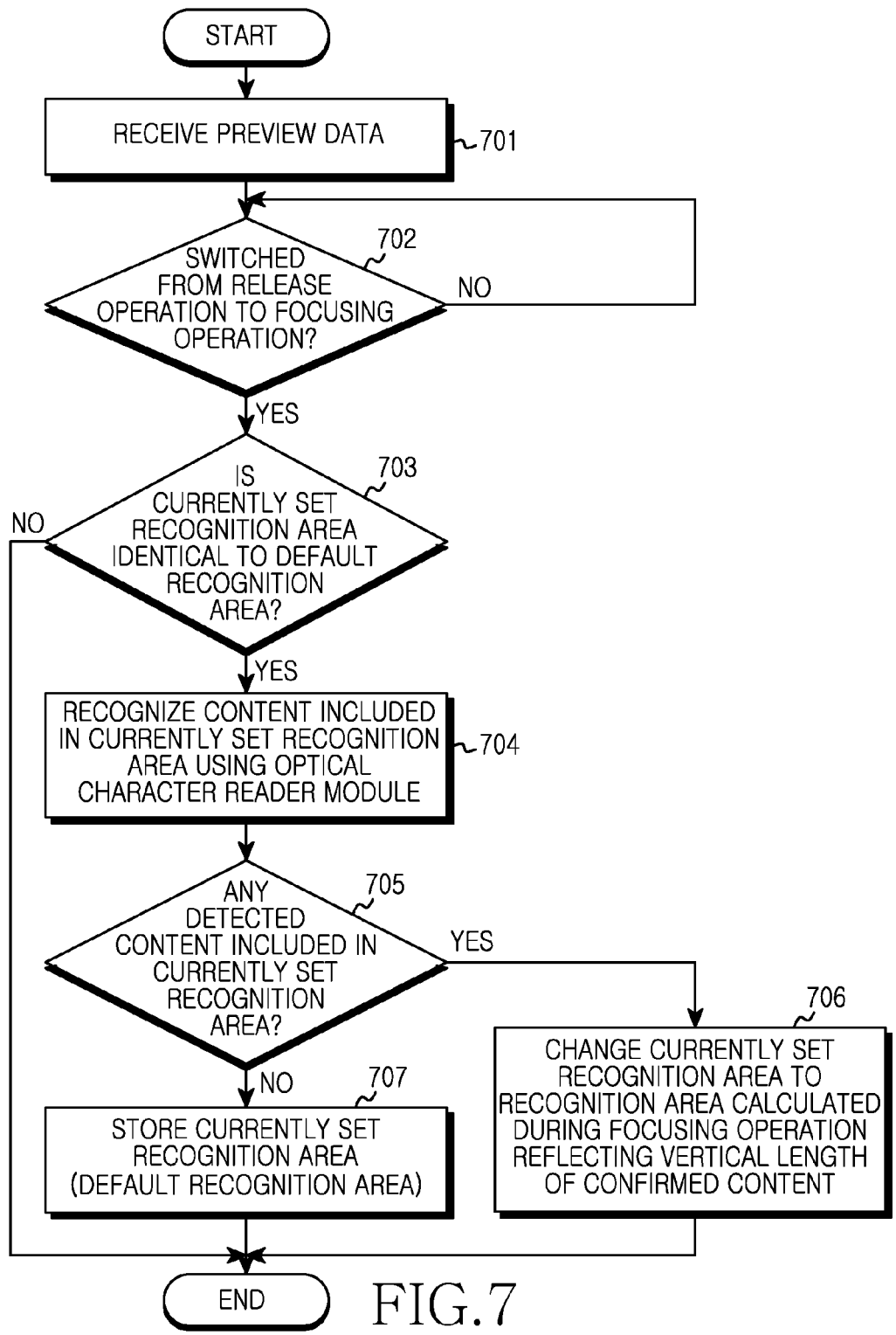
FIG. 7 is a flowchart illustrating calculation of a recognition area by an electronic device according to an embodiment of the present disclosure.

FIG. 7 is a flowchart illustrating calculation of a recognition area by an electronic device according to an embodiment of the present disclosure.

Referring to FIG. 7, a flowchart is illustrated, such that in operation 701, an electronic device may receive preview data. According to various embodiments, the electronic device may receive preview data, which is obtained by photographing a content to be recognized, in real time while the camera module is operating.

In operation 702, the electronic device may determine whether switching has occurred from a release operation to a focusing operation. According to various embodiments, the electronic device may determine whether switching has occurred from a release step, in which the lens of the camera module provided on the electronic device does not move, to a focusing step, in which the lens moves to make a focus. If the switching has not occurred in operation 702, the electronic device will continue to perform operation 702.

In operation 703, when the electronic device has determined that switching has occurred from the release operation to the focusing operation, the electronic device may determine whether the currently set recognition area is identical to the default area or not. According to various embodiments of the present disclosure, the electronic device may determine whether a recognition area for recognizing a content is identical to the default area or not.

When the electronic device has determined that the currently set recognition area is identical to the default recognition area, the electronic device may recognize a content included in the currently set recognition area by using an optical character reader module in operation 704. According to various embodiments of the present disclosure, when the electronic device has sensed a focusing step, the electronic device may recognize a content, which is included in the currently set recognition area, through an optical character reader module by using only one frame among preview data regarding a content that is being transmitted in real time.

Next, in operation 705, the electronic device may determine whether a content, which is included in the currently set recognition area, has been detected or not. According to various embodiments of the present disclosure, the electronic device may determine whether a content included in the currently set recognition area, i.e. the default recognition area, has been detected or not, as a result of recognition through an optical character reader module.

When the electronic device has determined that a content included in the currently set recognition area has been detected in operation 705, the electronic device may change the currently set recognition area to a recognition area, which has been calculated during a focusing operation to reflect the vertical length of the confirmed content, in operation 706. According to various embodiments of the present disclosure, the electronic device may change the recognition area in order to reduce current consumption by the electronic device and improve the content recognition ratio. According to an embodiment of the present disclosure, the electronic device may change the currently set recognition area to a recognition area, which has been calculated during a focusing operation to reflect the horizontal length of the confirmed content.

When the electronic device has determined that no content included in the currently set recognition area has been detected in operation 705, the electronic device may store the currently set recognition area (default recognition area) in operation 707. According to various embodiments of the present disclosure, the electronic device may store the default recognition area as the recognition area, when no content has been detected, and use the default recognition area as a recognition area for recognizing a content when the focusing operation ends.

According to various embodiments of the present disclosure, when the electronic device determines that the currently set recognition area is not identical to the default recognition area in the above-mentioned determining operation 703, the electronic device may instantly end the present embodiment for calculating the recognition area. According to various embodiments of the present disclosure, determination by the electronic device that the currently set recognition area is not identical to the default recognition area means that a recognition area, in which content recognition has succeeded at the latest previous time, will be used.

Figure 8:
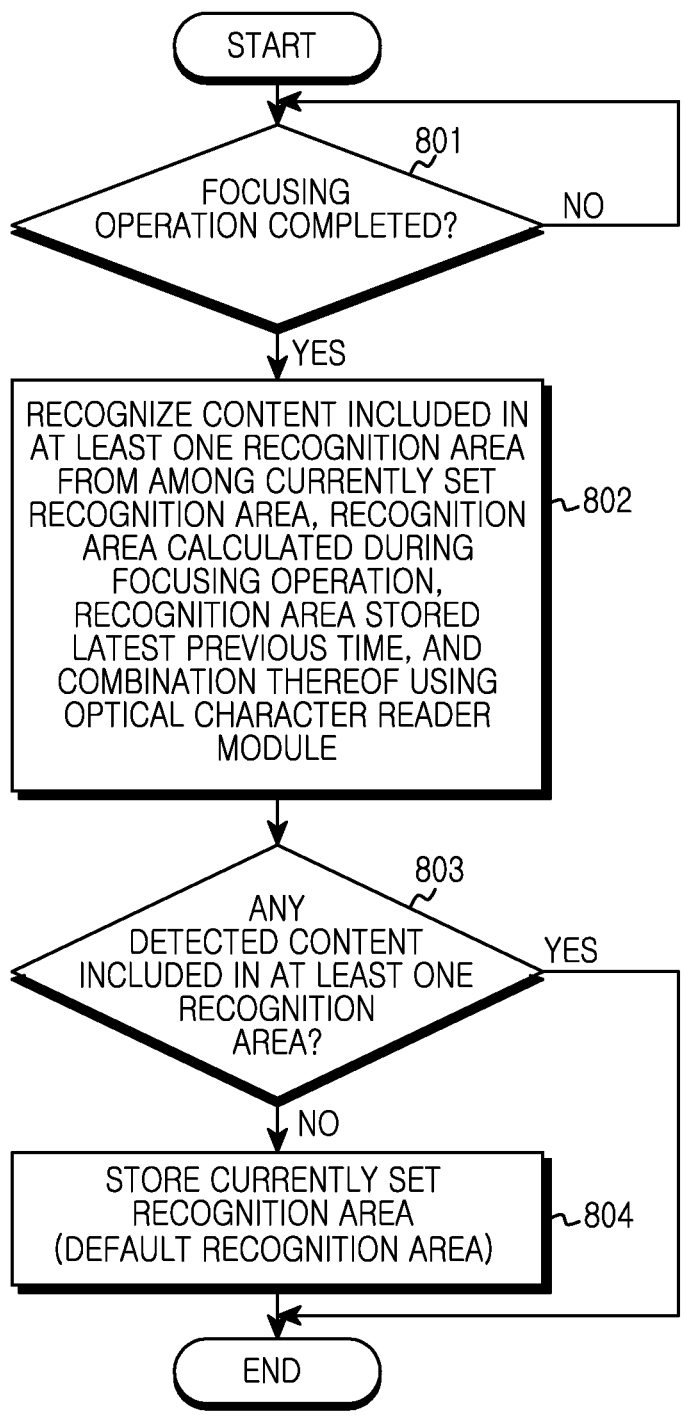
FIG. 8 is a flowchart illustrating recognition of a content by an electronic device using a variably changed recognition area according to an embodiment of the present disclosure.

FIG. 8 is a flowchart illustrating recognition of a content by an electronic device using a variably changed recognition area according to an embodiment of the present disclosure.

Referring to FIG. 8, a flowchart is illustrated, such that in operation 801, an electronic device may determine whether the focusing operation has been completed or not. According to various embodiments of the present disclosure, the electronic device may determine whether focusing of a content to be recognized has succeeded or not, after the focusing step, in which the lens moves to make a focus, is ended.

When the electronic device determines that the focusing operation has not been completed in operation 801, the electronic device continues to perform operation 801.

When the electronic device determines that the focusing operation has been completed in operation 801, the electronic device may recognize a content included in at least one recognition area from among the currently set recognition area, a recognition area calculated during the focusing operation, a recognition area stored at the latest previous time, and a combination thereof, by using an optical character reader module, in operation 802. According to various embodiments, when the electronic device has determined that a content included in the at least one recognition area has been detected, the electronic device may perform an operation according to content recognition.

In operation 803, the electronic device may determine whether a content, which is included in the at least one recognition area, has been detected or not. According to various embodiments of the present disclosure, the electronic device may determine whether a content included in at least one recognition area from among the currently set recognition area, a recognition area calculated during the focusing operation, a recognition area stored at the latest previous time, and a combination thereof has been detected or not by using an optical character reader module.

When the electronic device has determined that no content included in at least one recognition area has been detected in operation 803, the electronic device may store the currently set recognition area in operation 804. According to various embodiments of the present disclosure, the electronic device may store the default recognition area, which is the currently set recognition area, as the recognition area.

When the electronic device has determined that a content included in at least one recognition area has been detected as a result of determination in operation 803, the electronic device may perform an operation according to content recognition.

Figure 9:
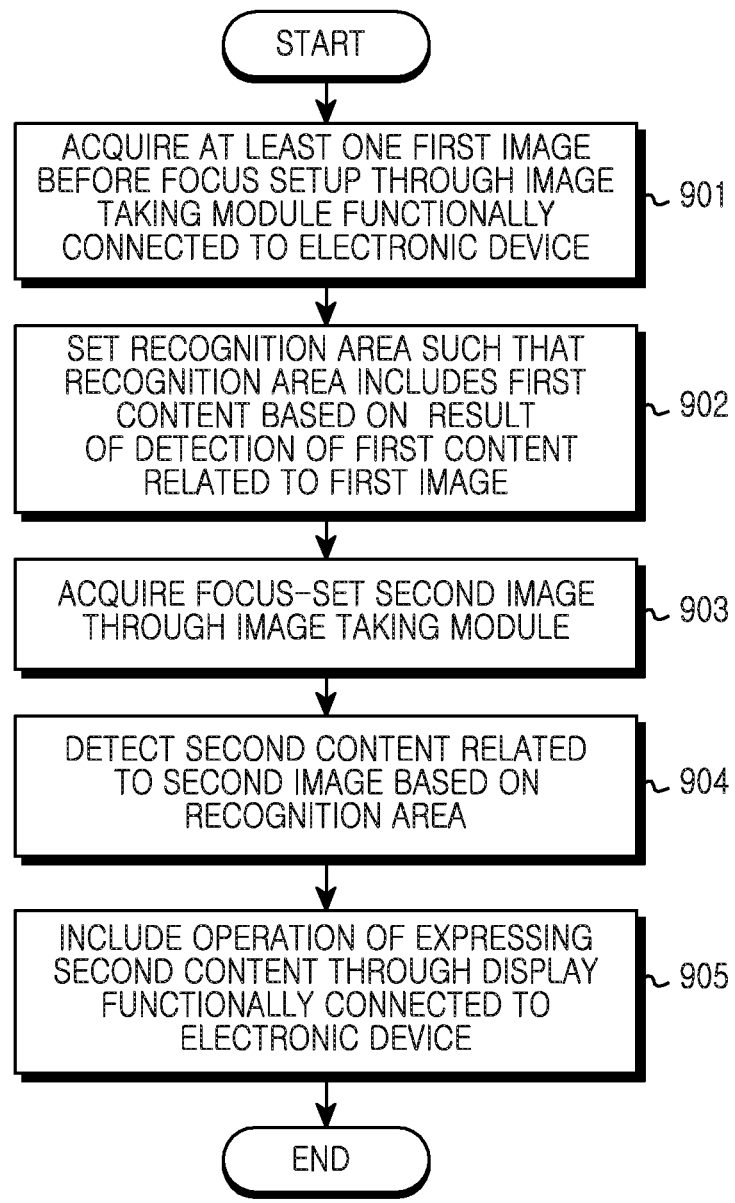
FIG. 9 is a flowchart of a method performed by an electric device according to an embodiment of the present disclosure.

FIG. 9 is a flowchart of a method performed by an electric device according to various embodiments of the present disclosure.

Referring to FIG. 9, in operation 901, at least one first image before focus setup may be acquired through an image taking module functionally connected to the electronic device.

In operation 902, the recognition area may be set, based on a result of detection of a first content related to the first image, such that the recognition area includes the first content.

In operation 903, a focus-set second image may be acquired through the image taking module.

In operation 904, a second content associated with the second image may be detected based on the recognition area.

In operation 905, a content of the electronic device, which includes an operation of expressing the second content through a display functionally connected to the electronic device, may be detected.

The method may include the operations of: acquiring at least one first image before focus setup through an image taking module functionally connected to an electronic device; setting a recognition area, based on a result of detection of a first content related to the first image, such that the recognition area includes the first content; acquiring a focus-set second image through the image taking module; detecting a second content related to the second image based on the recognition area; and expressing the second content through a display functionally connected to the electronic device.

In the operation of acquiring the at least one first image, at least one of a plurality of preview images generated while a lens of the image taking module is moving for the focus setup may be acquired as the at least one first image.

Each of the first content and the second content may be at least one from among a character, a QR code, and a barcode.

The setting operation may include the operations of: determining whether or not there is information stored in connection with a recognition area, in which a content recognition has succeeded before the first image is acquired; and determining the recognition area, when it is determined that the information exists, based on the information without performing the detection of the first content.

The setting operation may include an operation of setting, when the first content has been detected, a corresponding one from among a horizontal length and a vertical length of the first content based on at least one of the horizontal length and the vertical length of the first content.

The setting operation may include the operations of: detecting the first content based on a recognition area set based on a specified value; and reducing the recognition area based on at least one of the horizontal length and the vertical length of the first content.

The setting operation may include an operation of setting, when the first content has not been detected, at least one of the horizontal length and the vertical length of the recognition area as a specified value.

The detecting operation may include an operation of recognizing a second content, which is included in the recognition area, using an optical character reader module connected to the electronic device.

The detecting operation may include an operation of storing information related to the recognition area when the second content has been detected.

The detecting operation may include an operation of resetting information related to the recognition area to a specified value when the second content has not been detected.

The detecting operation may include the operations of: resetting the recognition area, when the second content has not been detected, based on a specified value; and detecting the second content from the second image based on the reset recognition area.

The expressing operation may include an operation of adding a specified visual effect to a part of the second image, which corresponds to the second content, and displaying the specified visual effect, or displaying a third content, which is associated with the second content, in a display area which is separated from or overlaps the second image.

The third content may include at least one from among a dictionary content, a web content, and a multimedia content, which are related to the content.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:
    acquiring, by the electronic device, a first image while focusing a camera of the electronic device;
    detecting a first content of the first image during the focusing of the camera;
    setting a recognition area including the first content during the focusing of the camera;
    after the camera is focused, acquiring a second image from the camera;
    detecting a second content of the second image based on the recognition area; and
    expressing the second content through a display connected to the electronic device.

2. The method of claim 1, further comprising:
    receiving a command to focus the camera,
    during the focusing of the camera, generating preview images, and
    selecting the first image from the preview images.

3. The method of claim 1,
    wherein the first content comprises at least one of a character, a quick response (QR) code, and a barcode, and
    wherein the second content comprises at least one of a character, a QR code, and a barcode.

4. The method of claim 1, wherein the setting of the recognition area comprises:
    determining if stored information corresponds to the recognition area; and
    when the stored information corresponds to the recognition area, determining the recognition area based on the stored information.

5. The method of claim 1, wherein the setting of the recognition area comprises determining a horizontal length based on the first content or determining a vertical length based on the first content.

6. The method of claim 1, wherein the setting of the recognition area comprises:
    detecting the first content based on a specific recognition area, the specific recognition area being based on a specified value; and
    reducing the recognition area based on at least one of a horizontal length and a vertical length of the first content.

7. The method of claim 1, wherein the setting of the recognition area comprises, when the first content is not detected, setting at least one of a horizontal length and a vertical length of the recognition area as a specified value.

8. The method of claim 1, wherein the detecting of the second content comprises recognizing the second content in the recognition area using an optical character reader module connected to the electronic device.

9. The method of claim 1, further comprising, when the second content is detected, storing information related to the recognition area.

10. The method of claim 1, further comprising, when the second content is not detected, discarding information related to the recognition area.

11. The method of claim 1, wherein the detecting of the second content comprises:
    when the second content is not detected,
    detecting the second content from the second image based on a specified area.

12. The method of claim 1, wherein the expressing of the second content comprises:
    adding a visual effect to a part of the second image, which corresponds to the second content, and
    displaying the visual effect or displaying a third content in a display area which is separate from or overlaps the second image.

13. The method of claim 12, wherein the third content comprises at least one of a dictionary content related to the second content, a web content related to the second content, and a multimedia content related to the second content.

14. A non-transitory computer-readable storage medium storing instructions that, when executed, cause at least one processor to perform the method of claim 1.

15. An electronic device comprising:
    a display;
    a camera configured to:
        generate a first image while the camera is focusing on an object, and generate a second image after the camera is focused on the object; and at least one processor configured to:
- detect a first content of the first image while the camera is focusing on the object,
- set a recognition area including the first content while the camera is focusing on the object,
- detect a second content of the second image based on the recognition area, and
- control the display to output the second content.

16. The electronic device of claim 15,
wherein the camera is further configured to generate preview images while the camera is focusing on the object, and
wherein the at least one processor is configured to select the first image from the preview images.

17. The electronic device of claim 15,
wherein the first content comprises at least one from among a character, a quick response (QR) code, and a barcode, and
wherein the second content comprises at least one of a character, a QR code, and a barcode.

18. The electronic device of claim 15, wherein the at least one processor is further configured to:
- determine if stored information corresponds to the recognition area, and
- when the stored information corresponds to the recognition area, determine the recognition area based on the stored information.

19. The electronic device of claim 15, wherein the at least one processor is further configured to:
- determine a horizontal length based on the first content or determine a vertical length based on the first content, and
- when the first content is not detected, set at least one of the horizontal length and the vertical length of the recognition area as a specified value.

20. The electronic device of claim 15, wherein the at least one processor is configured to:
- store information related to the recognition area when the second content is detected; and
- set the information related to the recognition area to a specified value when the second content is not detected.

* * * * *